United States Patent [19]
Hibi

[11] Patent Number: 5,333,309
[45] Date of Patent: Jul. 26, 1994

[54] PERSONAL COMPUTER FOR DISABLING RESUME MODE UPON REPLACEMENT OF HDD

[75] Inventor: Kenji Hibi, Tokyo, Japan

[73] Assignee: Kabushiki Kaisha Toshiba, Kawasaki, Japan

[21] Appl. No.: 121,458

[22] Filed: Sep. 16, 1993

Related U.S. Application Data

[63] Continuation of Ser. No. 604,457, Oct. 29, 1990, abandoned.

[30] Foreign Application Priority Data

Oct. 31, 1989 [JP] Japan ................... 1-281738

[51] Int. Cl.$^5$ ............................................... G06F 11/34
[52] U.S. Cl. ................................. 395/575; 364/264.2; 364/969; 364/231.1
[58] Field of Search ............... 395/575, 750; 364/264.2, 264.6, 927, 944.92, 971, 969, 231, 231.1, 231.2, 231.3, 231.31, 273.2, 273.4, 948.4, 969.2, 970.2, 707

[56] References Cited

U.S. PATENT DOCUMENTS

| | | | |
|---|---|---|---|
| 4,025,906 | 5/1977 | Riikonsn | 395/275 |
| 4,750,136 | 6/1988 | Arpin et al. | 364/514 |
| 4,862,355 | 8/1989 | Newman et al. | 395/275 |
| 4,979,106 | 12/1990 | Schneider | 395/700 |
| 5,014,193 | 5/1991 | Garner et al. | 395/275 |
| 5,038,320 | 8/1991 | Heath et al. | 395/275 |
| 5,151,992 | 9/1992 | Nagae | 395/750 |
| 5,193,176 | 3/1993 | Brandin | 395/575 |

FOREIGN PATENT DOCUMENTS

| | | |
|---|---|---|
| 0230351 | 7/1987 | European Pat. Off. |
| WO86/00154 | 1/1986 | World Int. Prop. O. |

*Primary Examiner*—Robert W. Beausoliel, Jr.
*Assistant Examiner*—Trinh Tu
*Attorney, Agent, or Firm*—Oblon, Spivak, McClelland, Maier & Neustadt

[57] ABSTRACT

A portable computer including a CPU, a detachable hard disk pack which is connectable to a system bus of the portable computer, and a hard disk pack replacement detector which detects, in a power-Off state, a detachment of the disk pack and sets a signal in a status register indicating the detachment of the disk pack. In response to a power-ON state, the CPU reads the status register to determine whether the disk pack had been detached during the power-OFF state and, if so, disables a resume flag so that operation does not resume at the operating state of the portable computer which existed immediately preceding the power-OFF state.

13 Claims, 5 Drawing Sheets

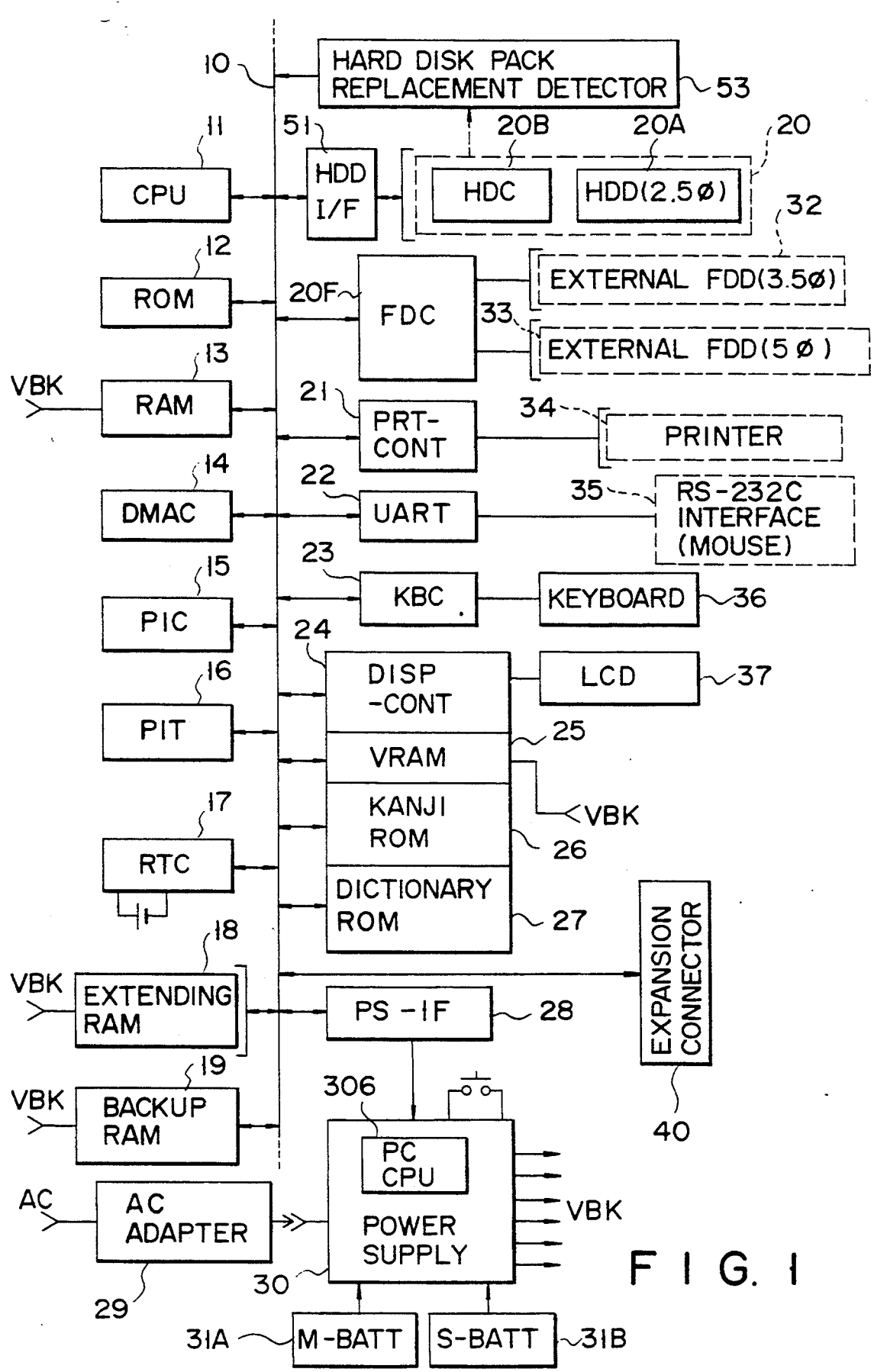
F I G. 1

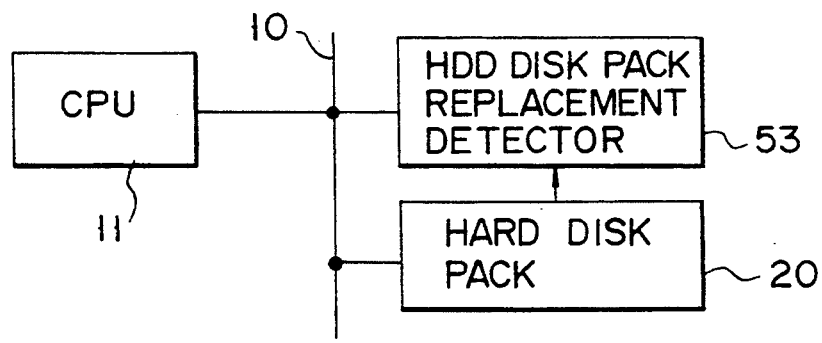
F I G. 2
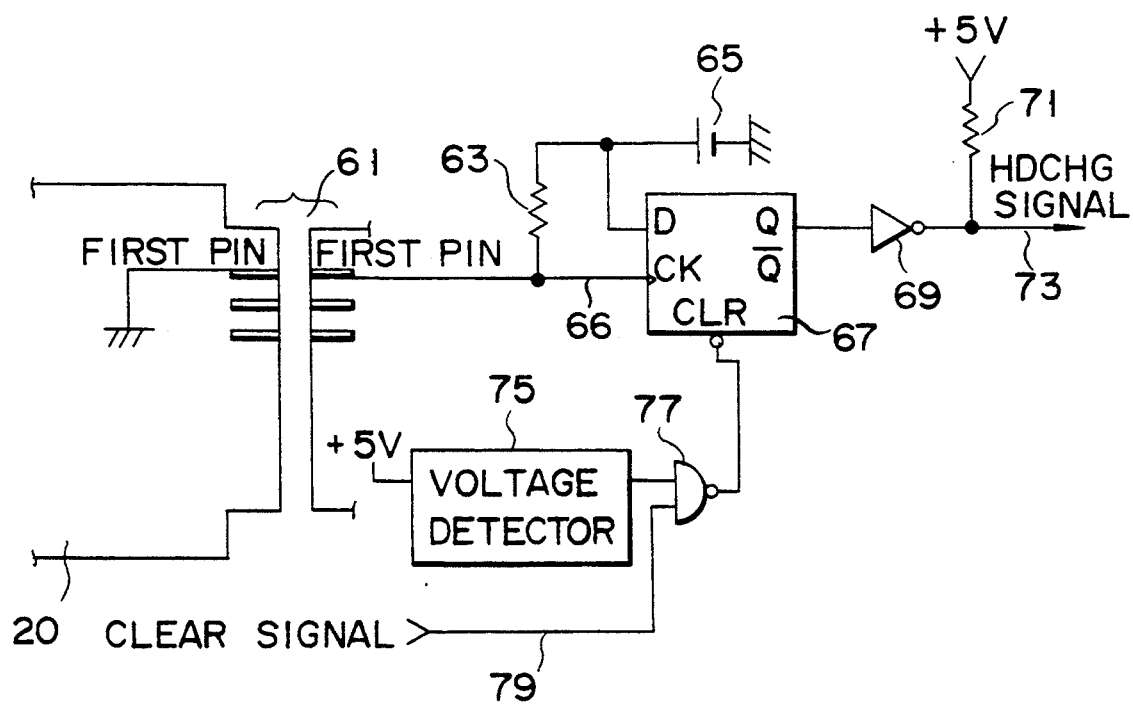
F I G. 3

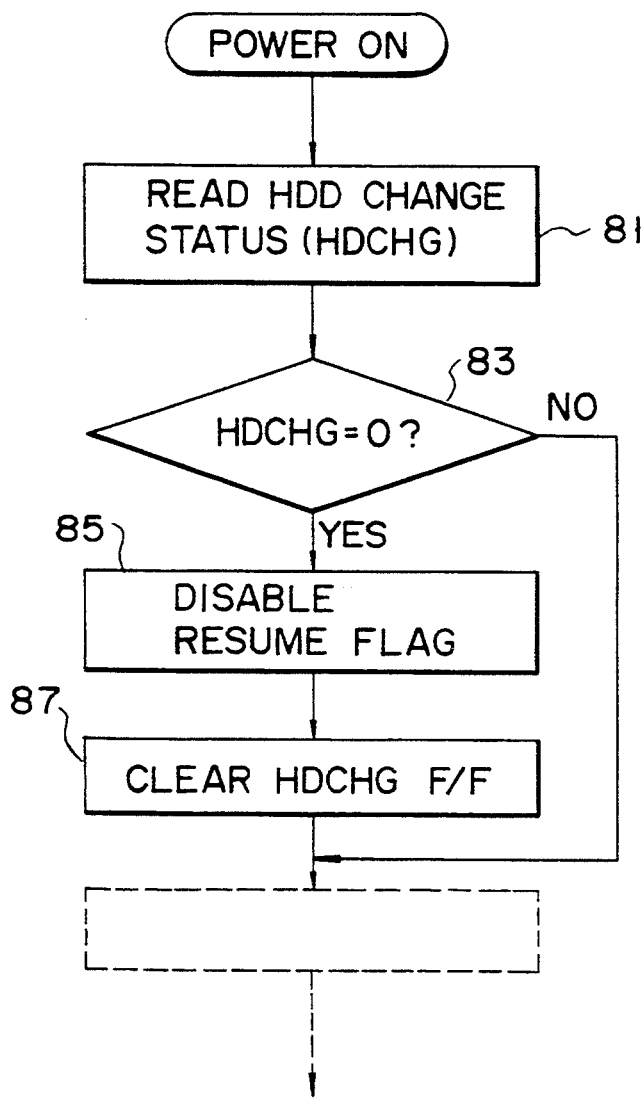
F I G. 4

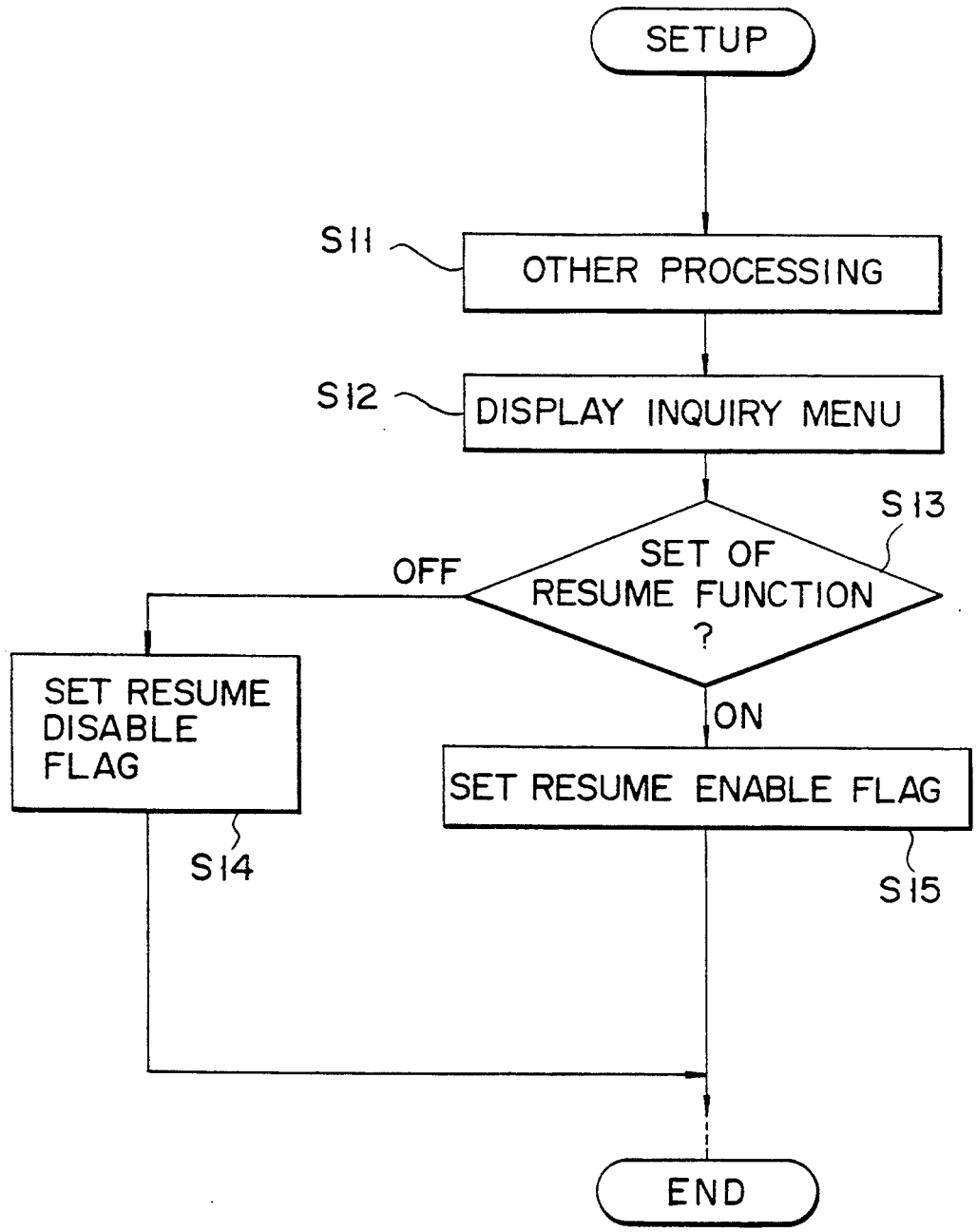
F I G. 5

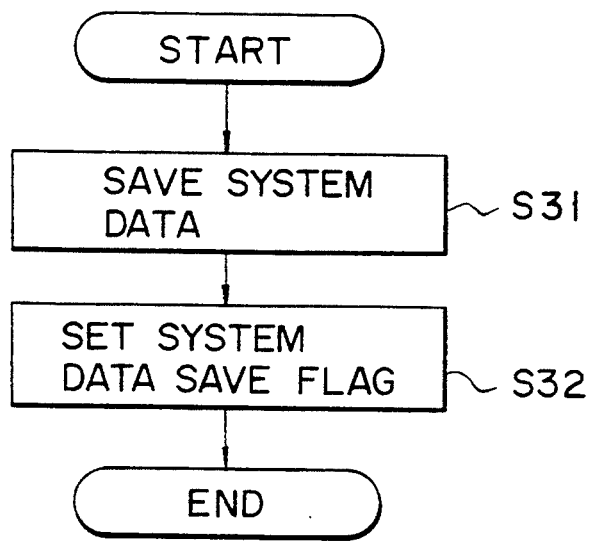
F I G. 6
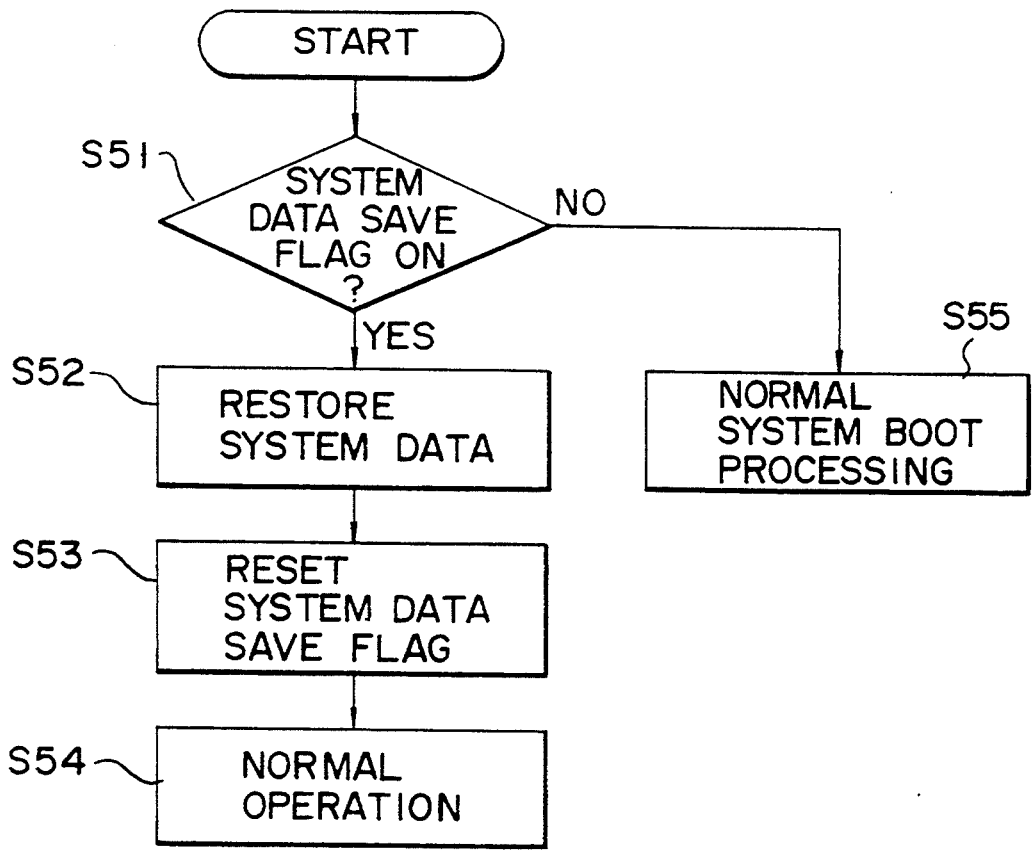
F I G. 7

PERSONAL COMPUTER FOR DISABLING RESUME MODE UPON REPLACEMENT OF HDD

This application is a continuation of application Ser. No. 07/604,457, filed on Jan. 29, 1990, now abandoned.

BACKGROUND OF THE INVENTION

1. Field of the Invention

The present invention relates to a personal computer using a replaceable hard disk as an external storage medium.

2. Description of the Related Art

In the field of personal computers in recent years, compact, lightweight, portable laptop personal computers have been very popular in place of conventional desk-top personal computers. Demand has increasingly arisen for more compact, lightweight, portable laptop personal computers. The most advanced laptop personal computer employs a low-profile floppy disk drive (FDD), and a display and a hard disk pack are detachably mounted in this personal computer.

In order to improve user operability, a laptop personal computer has a resume mode as a standard mode. In the resume mode, a state (i.e., a content of a memory and contents of various types of register) in the system is saved in a nonvolatile memory in a power-OFF state, and a state immediately before the power-OFF timing is restored upon power-ON. Therefore, Jobs can be continued regardless of a power-ON/OFF state.

A hard disk pack is generally replaced in a power-OFF state to prevent attachment/detachment of the hard disk pack while signal lines are kept active. In the above personal computer, however, if a hard disk pack is detachable and when it is replaced in a power-OFF state, a change in content of the hard disk pack is not detected and a Job is resumed in a resume mode. Therefore, the content of the hard disk pack is broken, and a system may overrun.

SUMMARY OF THE INVENTION

It is an object of the present invention to provide a personal computer, wherein replacement of a hard disk pack in a power-OFF state is detected, and a resume mode is disabled to prevent the content of the hard disk pack from damage and a program from overrun.

According to the first aspect of the present invention, a personal computer comprises: means for supplying a power to the personal computer; external storage medium means detachably connected to the personal computer; resume means for resetting a system to an immediately preceding state of a power-OFF operation in response to a power-ON operation after a power switch is turned off; status register means for detecting and registering that the external storage medium means is replaced in the power-OFF state; and control means for referring to the status register means when the power switch is turned on and invalidating the resume means when the external storage medium means is determined to be replaced.

According to the second aspect of the present invention, a method for controlling a personal computer having a detachable disk unit and a resume function, comprises the computer steps of: a) detecting and registering that the disk unit is detached in a power-OFF state; b) when a power switch is turned on again, checking whether the disk unit is detached; and c) determining that the disk unit is detached and invalidating the resume function.

According to the present invention, a hard disk pack replacement detector (powered from a backup power source) detects replacement of a hard disk pack in a power-OFF state, and this information is stored as status information in a memory backed up by a battery. When the power switch is turned on, a CPU checks the status information, detects replacement of the hard disk unit, releases the resume mode, and causes a display to display an alarm message to an operator.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a system block diagram showing an overall arrangement of a personal computer according to the present invention;

FIG. 2 is a block diagram showing a main part of the present invention;

FIG. 3 is a circuit diagram showing a detailed arrangement of a hard disk pack replacement detector shown in FIG. 2;

FIG. 4 is a flow chart showing a power-ON control program executed by a CPU 11;

FIG. 5 is a flow chart showing SETUP processing for setting a resume flag; and

FIGS. 6 and 7 are flow charts showing resume processing.

DETAILED DESCRIPTION OF THE PREFERRED EMBODIMENTS

FIG. 1 is a system block diagram showing an overall arrangement of a personal computer according to the present invention.

Referring to FIG. 1, components 11 to 28, 51, and 53 are connected to a system bus 10. The central processing unit (CPU) 11 controls the overall system and executes flow charts shown in FIGS. 4 to 7. The CPU 11 serves as a host CPU when viewed from a power control CPU 306 in a power supply 30 (to be described later). The read only memory (ROM) 12 stores a basic input and output program (BIOS). The BIOS includes programs shown in FIGS. 4 to 7 and is executed in response to a system power supply. Setup information stored in a specific area (or register) of the RAM 13 is loaded, and a system atmosphere is Judged. A boot block is loaded from the HDD 20A, and an operating system (OS) program stored in the HDD 20A is loaded in the RAM 13 by this boot block. The random access memory (RAM) 13 stores the operating system (OS), application programs, and various data. A backup power supply voltage VBK is supplied from the power supply 30 to the RAM 13. Even if a system power switch is turned off, the memory contents are not lost. The direct memory access (DMA) controller 14 performs direct memory access control. The controller (PIC) 15 is a programmable interrupt controller which can be set by a program. The timer (PIT) 16 is an interval timer which can be set by a program. When the interval timer 16 counts a time set by a program, the timer 16 supplies a time-out signal as an interrupt signal to the CPU 11 under the control of the programmable interrupt controller 15. The CPU 11 executes a vector interrupt routine in response to this interrupt signal. The real-time clock (RTC) 17 is a timepiece module having its own operation battery to display current time. The extending RAM 18 is a large-capacity memory detachably mounted in an extending RAM card slot in a main body, and a backup power (VBK) is supplied to the extending RAM 18. The backup RAM 19 constitutes a data storage area for realizing the resume function and is supplied with the backup power (VBK). The hard disk interface 51 interfaces the CPU 11 with the hard disk pack 20. The hard disk pack 20 is detachably mounted in a hard disk pack section of the main body. The hard disk pack 20 consists of, e.g., a 2.5" hard disk drive (HDD) 20A and a hard disk controller (HDC) 20B for controlling access of this drive.

The hard disk pack replacement detector 53 detects that a hard disk pack is replaced in a power-OFF state. The hard disk pack replacement detector 53 stores this detection information. The detection information is read by the CPU 11 when a power switch is turned on.

The floppy disk controller (FDC) 20F controls a 3.5" optional floppy disk drive (external FDD) 32 and a 5" optional external floppy disk (external FDD) 33. The printer controller 21 is connected to an external printer 34. The input/output interface 22 is a universal asynchronous receiver/transmitter (UART). An RS-232C interface equipment 35 is connected to the interface 22, as needed. The keyboard controller (KBC) 23 controls a keyboard 36. The display controller (DISP-CONT) 24 controls a liquid crystal display (LCD) 37. The video RAM 25 is supplied with the backup power (VBK) and stores video data. The kanji ROM 26 stores kanji character patterns corresponding to kanji character codes. The dictionary ROM 27 stores a correspondence between kana and kanji characters and a kanji conversion dictionary. The power supply control interface (PS-IF) 28 connects a power supply 30 to the CPU 11 through the system bus 10. A power supply adapter (AC adapter) 29 is plugged in the personal computer main body to rectify and smooth a commercial AC power and obtain a DC operating power having a predetermined voltage. An expansion unit is selectively connected to an expansion connector 40. The intelligent power supply (power controller) 30 comprises the power control CPU 306 and supplies power to each unit described above. A battery (M-BATT) 31A is a detachable main battery pack constituted by a rechargeable battery. A battery (S-BATT) 31 is a sub-battery incorporated in the main body and constituted by a rechargeable battery.

FIG. 2 is a block diagram showing a relationship between the hard disk pack 20, the hard disk pack replacement detector 53, and the CPU 11. When the hard disk pack 20 is replaced in the power-OFF state, the hard disk pack replacement detector 53 detects it and registers it as status information. Upon a power-ON operation, the CPU 11 reads the status information stored in the hard disk pack replacement detector 53 and determines whether the hard disk pack is replaced in the power-OFF state.

FIG. 3 is a circuit diagram showing a detailed arrangement of the hard disk pack replacement detector 53.

The hard disk pack 20 is detachably connected to the personal computer main body through a connector 61. A specific connector pin on the hard disk pack 20 side, e.g., the first pin, is connected to the ground potential. The first connector pin on the computer main body side is connected to a backup power supply 65 through a pull-up resistor. The first pin of the connector 61 on the computer main body side is connected to a clock input terminal CK of a flip-flop (F/F) 67 through a signal line 66. When the hard disk pack 20 is kept connected to the computer main body, a signal of logic "0" level is supplied to the clock input terminal CK of the F/F 67. When the hard disk pack 20 is detached from the computer main body, a signal of logic "1" level is supplied to the clock input terminal CK of the F/F 67. Therefore, the signal of logic "1" level from the power supply 65 is supplied to the D input terminal of the F/F 67, and a signal of logic "1" level representing replacement of the hard disk pack 20 is set in the F/F 67. The Q output terminal of the F/F 67 is connected to an open collector type gate 69. The output terminal of the gate 69 is normally pulled up to the power supply (+5V) through a pull-up resistor 71. An output signal HDCHG from the gate 69 is supplied to the CPU 11 through a signal line 73.

A normally voltage detector 75 monitors the power supply (+5V) and outputs a signal of logic "1" level to an AND gate 77 in a normal voltage state (i.e., +5V, 10%). When this power supply is set at low level, the voltage detector 75 outputs a signal of logic "0" level to the AND gate 77. A clear signal is supplied from the CPU 11 to the other input terminal of the AND gate 77 through a signal line 79. When the power supply voltage is normal and a high-level (active high) signal is supplied from the CPU 11, the AND gate 77 supplies a signal for clearing the F/F 67 to a clear terminal CLR of the F/F 67. The AND gate 77 is arranged to prevent the content of the F/F 67 from being broken upon power-ON/OFF.

An operation of the embodiment having the above arrangement will be described with reference to a flow chart in FIG. 4.

When an operator turns off the switch of the computer main body and removes the hard disk pack 20, the level of the signal line 67 is changed from low level (logic "0") to high level (logic "1") by the backup power supply 65 and a pull-up resistor 63. As a result, a signal of logic "1" level is set in the F/F 67. Then, an HDCHG signal as a low-level (logic "0") output signal from the gate 69 is output. The operator connects a desired hard disk pack 20 to the computer main body through the connector 61 and turns on the system switch.

In response to this power-ON operation, the CPU 11 executes the flow chart in FIG. 4. More specifically, the HDCHG signal is read in step 81. The CPU 11 determines an HDCHG level in step 83. If the CPU 11 determines level "0" of the HDCHG signal, i.e., determines that the hard disk pack 20 has been replaced, a resume mode flag set in a register (not shown) is cleared in step 85. In step 85, the CPU 11 clears the F/F 67 through the AND gate 77. In step 87, a message representing that resume processing is performed due to replacement of the hard disk pack is displayed on the LCD 37, as needed. Resume operations from step 85 are not performed, and system initialization processing is executed. Therefore, damage to the content of the hard disk pack by execution of the resume processing can be prevented.

FIG. 5 is a flow chart showing SETUP processing for setting a resume flag shown in step 85 of FIG. 4.

The operator depresses a function key or inputs a predetermined command to start a setup program. The setup program contains various contents and is used to execute various processing operations (step S11). When the current operation reaches enable/disable setup of the resume function, a menu inquiring whether the resume function is enabled is displayed on the LCD 37 (step S12). In response to this inquiry, the operator inputs from the keyboard 36 an instruction whether the resume function is enabled. The input instruction is determined in step S13. When the input instruction represents enabling of the resume function, a resume flag is set (step S15).

FIG. 6 shows save processing of resume processing. In response to a power-OFF operation, the CPU 11 saves system data such as contents of registers of the CPU 11, contents of various registers, and the content of the program counter in the RAM 13 in step S31. In step S32, the CPU 11 sets a system data save flag.

FIG. 7 shows restore processing of the resume processing. That is, in response to a power-ON operation, the CPU 11 determines in step S51 whether the system data save flag is ON. If YES in step S51, the CPU 11 restores, in step S52, various system data saved in the RAM 13. In step S53, the system data save flag is reset. On the other hand, if NO in step S51, the CPU 11 performs a normal system boot processing in step S55.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A portable computer to which a removable unit is detachably connected through a connector, comprising:
    means for supplying a power to elements constituting said portable computer;
    resume means for resuming operation at a state of said portable computerexisting immediately preceding a power-OFF operation in response to a power-ON operation after a power switch is turned off;
    detecting means for detecting that said removable unit is replaced during the power-OFF operation from a change of level of a signal from the connector and for outputting a detection result representing that said removable unit has been replaced during the power-OFF operation;
    latch means for latching the detection result from said detecting means; and
    control means for reading the detection result from said latch means when said power switch is turned on and disabling said resume means when said removable unit is determined to have been replaced during said power-OFF operation so that operation of said portable computer after said power-OFF operation does not resume at said state immediately preceding said power-OFF operation when said removable unit is detached during the power-OFF operation.

2. The computer according to claim 1, wherein said latch means is backed up by a battery.

3. A computer according to claim 1, wherein said control means reads the detection result from said latch means every time said power switch is turned on, and disables said resume means when said control means determines that said removable unit has been replaced.

4. A computer according to claim 1, further comprising means for clearing a content of said latch means after said control means disables said resume means.

5. The computer according to claim 1, wherein said control means disabling said resume means comprise flag means representing disabling of said resume means.

6. A computer according to claim 1, wherein said latch means comprises connector means, a specific pin of which is assigned to output a specific signal in response to attachment or detachment of said removable unit.

7. A method of controlling a portable computer having a detachable disk unit and a resume function in which a state of said portable computer immediately preceding a power-OFF operation is resumed in response to a power-ON operation after a power switch is turned off, said method comprising the steps of:
    a) detecting and registering that said disk unit is detached during said power-OFF operation;
    b) when a power switch is turned on again to end said power-OFF operation, checking whether said disk unit had been detached during said power-OFF operation; and
    c) disabling said resume function when said checking step determines that said disk unit had been detached during said power-OFF operation so that after said power-OFF operation said portable computer does not resume operation at said state immediately preceding said power-OFF operation when said disk unit is detached during the power-OFF operation.

8. A computer according to claim 1, wherein said removable unit is an external storage unit.

9. A computer according to claim 8, wherein said external storage unit is a hard disk drive pack.

10. A portable computer to which a removable unit is detachably connected through a connector, comprising:
    means for supplying a power to elements constituting said portable computer;
    resume means for resuming operation of said portable computer at a state immediately preceding a power-OFF operation in response to a power-ON operation after a power switch is turned off;
    detecting means for detecting that said removable unit is replaced during the power-OFF operation from a change of level of a signal from the connector and for outputting a detection result representing that said removable unit has been replaced during the power-OFF operation;
    latch means for latching the detection result from said detecting means; and
    control means for reading the detection result from said latch means when said power switch is turned on, for determining if said removable unit had been replaced during said power-OFF operation and for executing a system boot processing to set up said portable computer when said removable unit is determined to have been replaced.

11. A computer according to claim 10, wherein said removable unit is an external storage unit.

12. A computer according to claim 11, wherein said external storage unit is a hard disk drive pack.

13. A method for controlling a portable computer having a detachable disk unit and a resume function in which a state of said portable computer immediately preceding a power-OFF operation is resumed in response to a power-ON operation after a power switch is turned off, said method comprising the computer steps of:

a) detecting and registering that said disk unit is detached during said power-OFF operation;
b) when a power switch is turned on again, checking whether said disk unit had been detached during said power-OFF operation; and
c) setting up said portable computer by a bootstrap when said checking step determines that said disk unit had been detached during said power-OFF operation.

* * * * *